United States Patent
Bowers et al.

(10) Patent No.: US 6,570,593 B1
(45) Date of Patent: May 27, 2003

(54) MANAGEMENT GRAPHICAL USER INTERFACE FOR A NETWORK FILE SYSTEM

(75) Inventors: Sandra Ann Bowers, Austin, TX (US); Michael William Panico, Austin, TX (US); Hypatia Rojas, Round Rock, TX (US); Kim-Khanh Vu Tran, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/513,815

(22) Filed: Feb. 24, 2000

(51) Int. Cl.[7] ................................................. G09G 5/00
(52) U.S. Cl. ........................ 345/775; 345/748; 345/853; 707/102; 707/205
(58) Field of Search ................................ 345/744, 748, 345/749, 775, 853, 854, 855; 707/102, 101, 205

(56) References Cited

U.S. PATENT DOCUMENTS 5,537,531 A * 7/1996 Suga et al. .................. 345/543
6,021,413 A * 2/2000 Vaduvur et al. ............ 707/201
6,356,863 B1 * 3/2002 Sayle ........................... 703/27

OTHER PUBLICATIONS

Task Help for Network NFS, available via the Internet at http://www.rs6000.ibm.com/doc_link/en_US/a_doc_lib//wsmehelp/wsmenet/net_nfs.htm, printed Nov. 30, 1999, 8 pp.

Mounting Overview, available via the Internet at http://www.rs600.ibm.com/doc_link/en_US/a_doc_lib/aixbman/ad.../mount_overview.htm, printed Nov. 30, 1999, 3 pp.

Mount Command, available via the Internet at http://www.rs6000.ibm.com/doc_link/en_US/a_doc_lib/cmds/aixcmds3/mount.htm, printed Nov. 30, 1999, 7 pp.

* cited by examiner

*Primary Examiner*—Ba Huynh
(74) *Attorney, Agent, or Firm*—Kelly K. Kordzik; Winstead Sechrest & Minick P.C.; Diana L. Roberts

(57) ABSTRACT

A graphical user interface is implemented with unique icons for registered but not mounted file systems, registered and mounted file systems, and mounted but not registered file systems. The unique icon for the registered but not mounted file systems permits management of such file systems by users within the network.

16 Claims, 4 Drawing Sheets

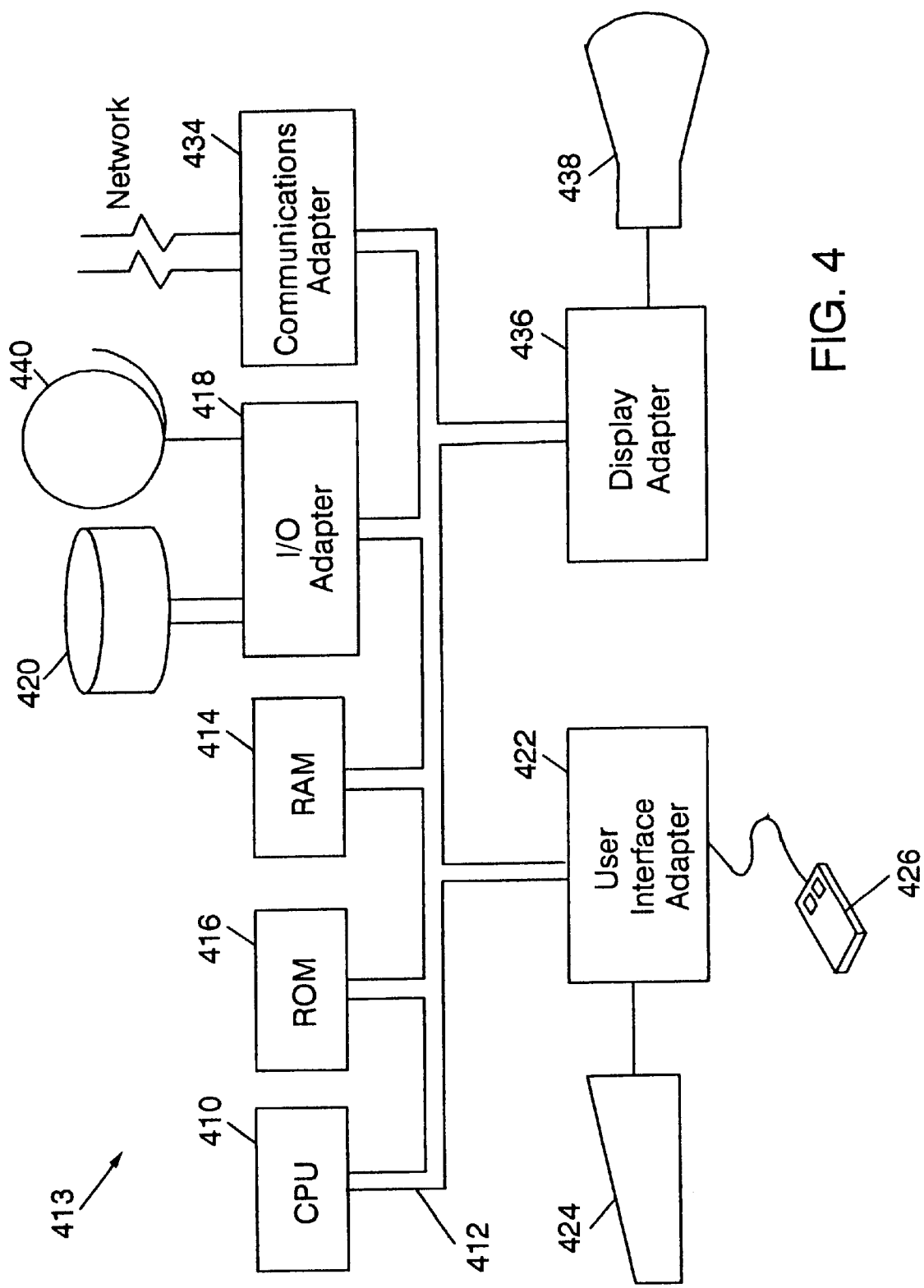

MANAGEMENT GRAPHICAL USER INTERFACE FOR A NETWORK FILE SYSTEM

TECHNICAL FIELD

The present invention relates in general to data processing systems, and in particular, to the management of network file systems.

BACKGROUND INFORMATION

A Network File System ("NFS") is a distributed file system of files and directories located on remote computers within a network. Using NFS, one can manage remote files and directories as if they are local, mount referenced files systems, configure security options, manage mount properties and establish access permissions for hosts.

Mounting makes file systems, files, directories, devices, and special files available for use at a particular location. It is the only way a file system is made accessible. A mount command instructs the operating system (OS) to attach a file system at a specified directory. Thus, a mounted file system or directory permits mounting on a client machine which gives the client access to the directory of files at different locations. Such a mount command is used in UNIX systems, but is also available with other operating systems, such as Windows NT.

Currently, such mounted file systems or directories are registered in that information, characteristics or attributes about the file system or directory are recorded, and can thus be altered. For example, such attributes can be whether the directory is mounted at boot up, is read-only, read/write, or includes echos.

The prior art only provides an ability to manage two types of mounted file systems, registered but not mounted, and registered and mounted. What is not available in the art is an ability to manage mounted but not registered file systems.

SUMMARY OF THE INVENTION

The present invention addresses the foregoing need by providing an icon in a graphical user interface so that a user may manage a mounted but not registered file system or directory in a manner similar as provided for registered but not mounted and registered and mounted directories. This would permit a user to mount a file system temporarily while implementing a graphical user interface icon to promote management of such a temporary file system. More specifically, the system merges a list of registered NFS mountable file systems and a list of NFS mounted file systems and removes duplicate entries. For each entry in the list, if the entry is not a registered NFS mountable file system, then a new icon is displayed for the unregistered and mounted file system to permit its management by the user.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates a data processing system configurable in accordance with the present invention.

DETAILED DESCRIPTION

Figure 1:
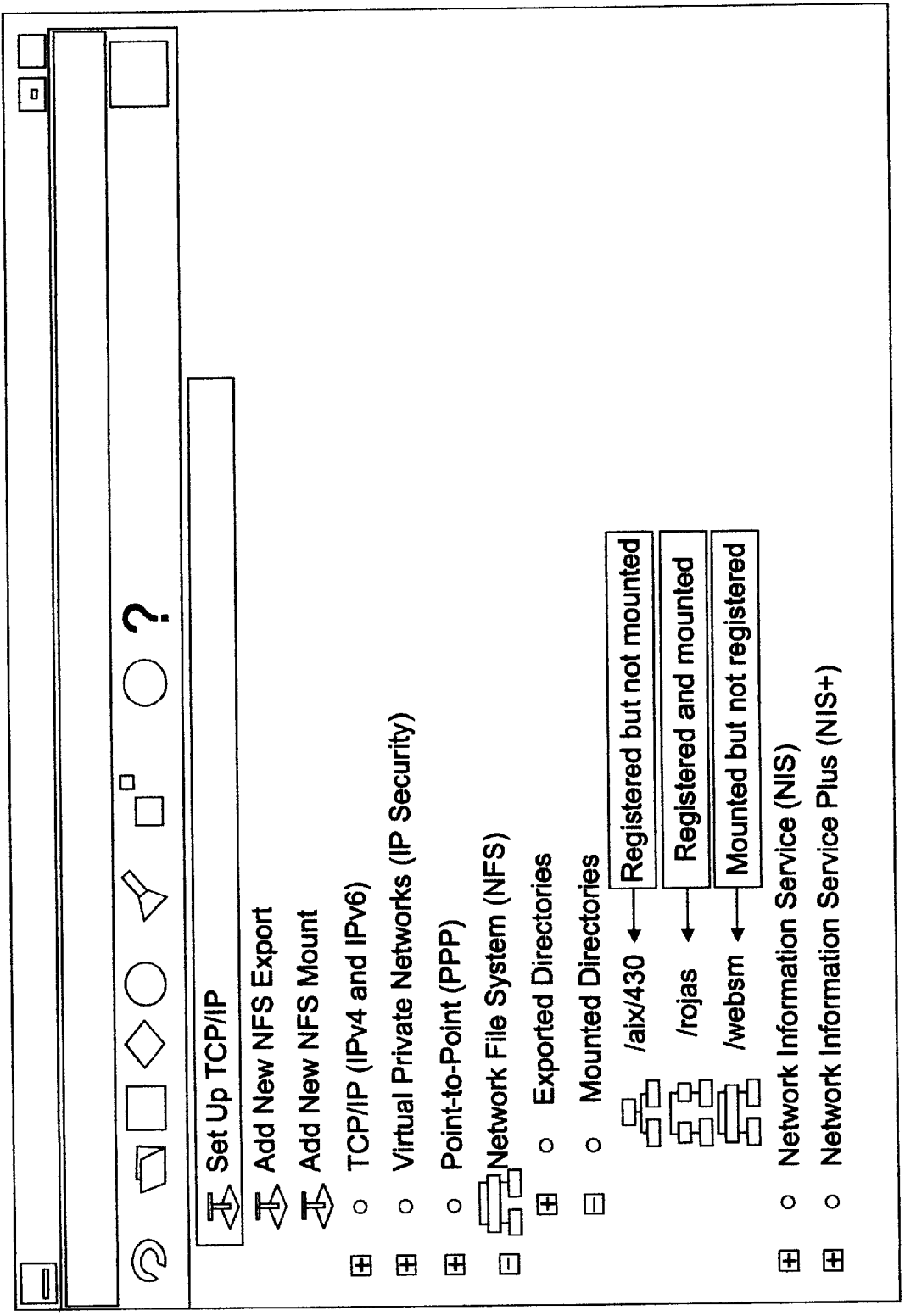
FIG. 1 illustrates a graphical user interface in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

As noted above, presently there are only icons provided to users in a network for managing the two types of mounted file systems, registered but not mounted, and registered and mounted. The present invention provides a GUI icon that permits a user to manage a "mounted but not registered" file system. FIG. 1 illustrates three different icons for the registered but not mounted, registered and mounted, and mounted but not registered file systems. A mounted but not registered file system is not persistent in the NFS in that its attributes cannot be changed. Such a file system can be mounted one time, and upon reboot of the system, it is automatically removed. The prior art has not implemented such a unique GUI icon to permit management of a mounted but not registered file system or directory. Such management can include permitting a user to select an icon, determine how many such mounted but not registered file systems are available to the user, and to un-mount such a file system. For example, when developing program code, a user can access that code from a co-developer at another location when the co-developer has mounted the file containing the code. Another example is where a company can mount a database to permit a customer to access the database on a temporary basis.

The reason such mounted but not registered file systems are desired is that there is a need to have such file systems to temporarily exist. One reason for a need for such a temporary file system is to save memory by having the file system be removed upon reboot of the system.

Figure 2:
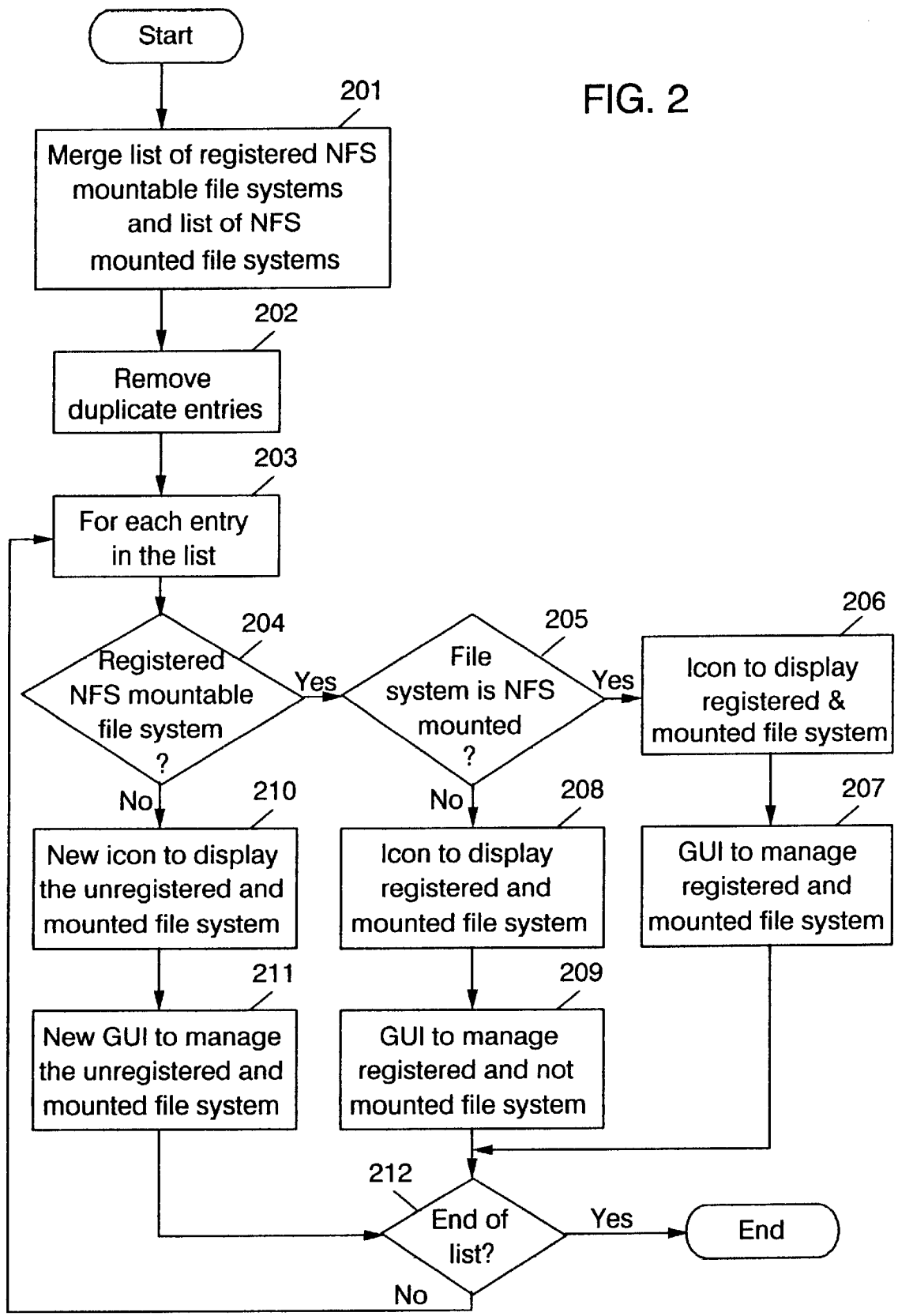
FIG. 2 illustrates a flow diagram for implementing the present invention.

Referring next to FIG. 2, there is illustrated a flow diagram for implementing a process whereby the GUI icons illustrated in FIG. 1 are generated in accordance with the present invention. In step 201, the list of registered NFS mountable file systems and the list of NFS mounted file systems, whether registered or not, are merged. In step 202, any duplicate entries are removed from the merged list. In step 203, each entry in the list is then considered in steps 204–212. In step 204, a determination is made whether an entry in the list is a registered NFS mountable file system. If yes, the process proceeds to step 205 to determine if the registered NFS mountable file system is mounted. If yes, then in step 206, a unique icon is created and displayed for the registered and mounted file system and placed, in step 207, in the GUI shown in FIG. 1 to permit management of the registered and mounted file system. In step 205, if the registered file system is not mounted, then in step 208, a unique icon is created and displayed for the registered and mounted file system. In step 209, this icon is placed in the GUI of FIG. 1 to permit management of the registered and not mounted file system.

In step 204, if the entry in the list is not a registered NFS mountable file system, then in step 210, a unique icon is created for display of the unregistered and mounted file system, and then placed within the FIG. 1 GUI, in step 211, to promote management of the mounted and not registered file system. Each of steps 207, 209 and 211 then proceed to step 212, where the process is repeated through a return to step 203, if the end of the list has not been reached.

Figure 3:
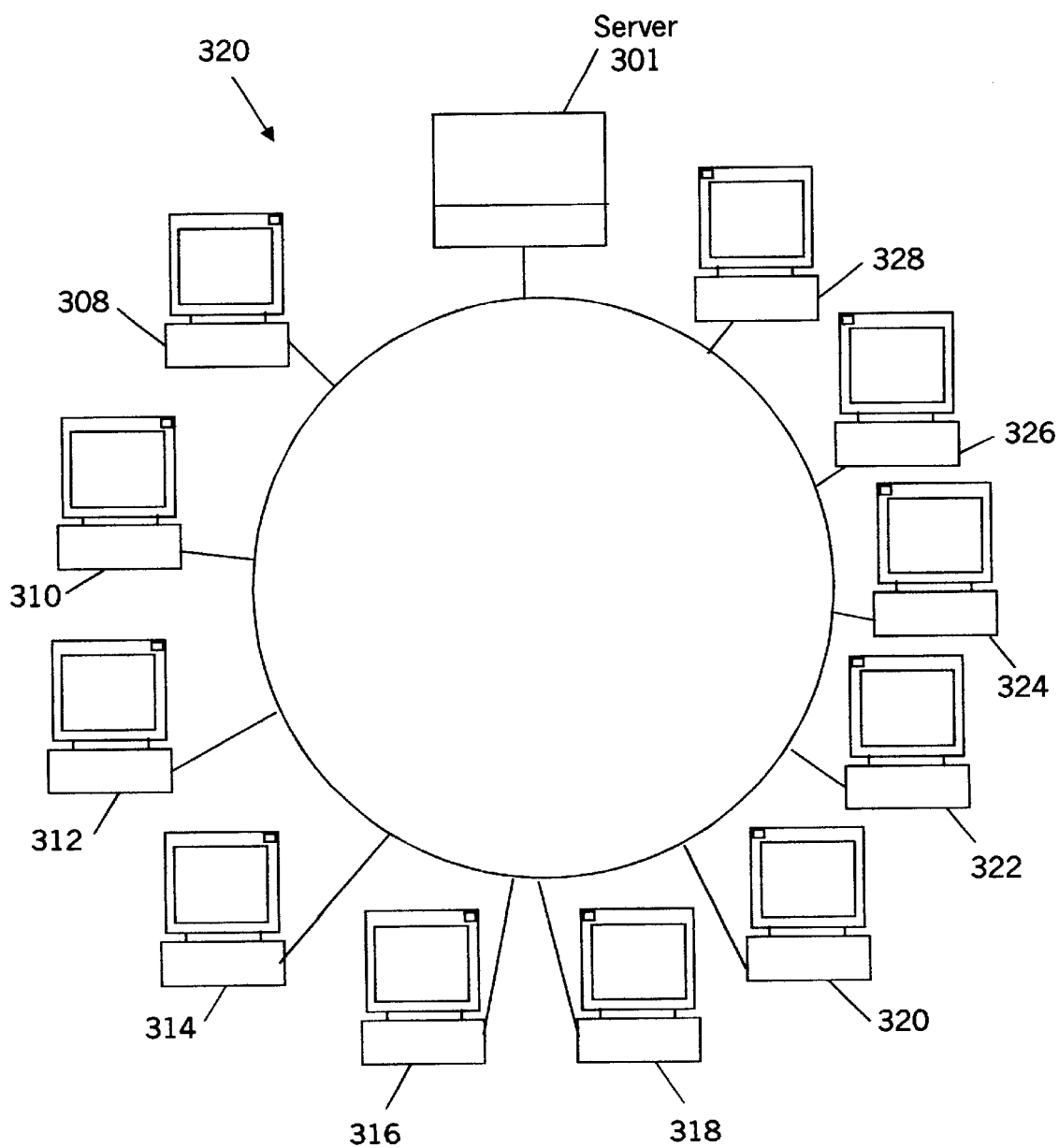
FIG. 3 illustrates a network configurable in accordance with the present invention.

Referring next to FIG. 3, there is illustrated a network 300 having a server 301 coupled in network 300 to client machines 308 . . . 328, in any network configuration commonly used.

Each of the server 301 and the client machines 308 . . . 328 may be comprised of a data processing system as illustrated in FIG. 4. Referring to FIG. 4, an example is shown of a data processing system 400 which may be used for the invention. The system has a central processing unit (CPU) 410, which is coupled to various other components by system bus 412. Read only memory ("ROM") 416 is coupled to the system bus 412 and includes a basic input/output system ("BIOS") that controls certain basic functions of the data processing system 400. Random access memory ("RAM") 414, I/O adapter 418, and communications adapter 434 are also coupled to the system bus 412. I/O adapter 418 may be a small computer system interface ("SCSI") adapter that communicates with a disk storage device 420. Communications adapter 434 interconnects bus 412 with an outside network enabling the data processing system to communicate with other such systems. Input/Output devices are also connected to system bus 412 via user interface adapter 422 and display adapter 436. Keyboard 424 and mouse 426 are interconnected to bus 412 via user interface adapter 422. Display monitor 438 is connected to system bus 412 by display adapter 436. In this manner, a user is capable of inputting to the system throughout the keyboard 424 or mouse 426 and receiving output from the system via display 438.

Preferred implementations of the invention include implementations as a computer system programmed to execute the method or methods described herein, and as a computer program product. According to the computer system implementation, sets of instructions for executing the method or methods are resident in the random access memory 414 of one or more computer systems configured generally as described above. Until required by the computer system, the set of instructions may be stored as a computer program product in another computer memory, for example, in disk drive 420 (which may include a removable memory such as an optical disk or floppy disk for eventual use in the disk drive 420). Further, the computer program product can also be stored at another computer and transmitted when desired to the users work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Although the present invention and its advantages have been described in detail, it should be understood that various changes, substitutions and alterations can be made herein without departing from the spirit and scope of the invention as defined by the appended claims.

What is claimed is:

1. A method for managing file systems in a network file system ("NFS"), comprising the steps of:

associating an unregistered and mounted file system with a unique icon; and displaying the unique icon associated with the unregistered and mounted file system.

2. The method as recited in claim 1, wherein the associating step further comprises the steps of:

merging a list of registered NFS mountable file systems and a list of NFS mounted file systems;

removing duplicate entries in the merged list;

for each entry in the merged list, determining if the entry is a registered NFS mountable file system; and if the entry is not a registered NFS mountable file system, associating the entry with the unique icon.

3. The method as recited in claim 2, wherein the displaying step displays the unique icon to a user.

4. The method as recited in claim 1, wherein the unique icon is not persistent.

5. The method as recited in claim 2, further comprising the steps of:

if the entry is a registered NFS mountable file system, determining if the entry is a mounted file system; and if the entry is a mounted file system, associating the entry with a second unique icon.

6. The method as recited in claim 5, further comprising the steps of:

if the entry is not a mounted file system, associating the entry with a third unique icon.

7. A network comprising a server coupled to a plurality of client machines, the network further comprising:

circuitry for associating an unregistered and mounted file system with a unique icon; and circuitry for displaying the unique icon associated with the unregistered and mounted file system.

8. The network as recited in claim 7, wherein the associating circuitry further comprises:

circuitry for merging a list of registered NFS mountable file systems and a list of NFS mounted file systems;

circuitry for removing duplicate entries in the merged list;

circuitry for determining if the entry is a registered NFS mountable file system for each entry in the merged list; and circuitry for associating the entry with the unique icon if the entry is not a registered NFS mountable file system.

9. The network as recited in claim 7, wherein the unique icon is not persistent.

10. The network as recited in claim 9, further comprising:

circuitry for determining if the entry is a mounted file system if the entry is a registered NFS mountable file system; and circuitry for associating the entry with a second unique icon if the entry is a mounted file system.

11. The network as recited in claim 10, further comprising:

circuitry for associating the entry with a third unique icon if the entry is not a mounted file system.

12. A computer program product adaptable for storage on a computer readable medium, the computer program product operable for performing the following program steps:

associating an unregistered and mounted file system with a unique icon; and displaying the unique icon associated with the unregistered and mounted file system.

13. The computer program product as recited in claim 12, wherein the associating program step further comprises the program steps of:

merging a list of registered NFS mountable file systems and a list of NFS mounted file systems;

removing duplicate entries in the merged list;

for each entry in the merged list, determining if the entry is a registered NFS mountable file system; and if the entry is not a registered NFS mountable file system, associating the entry with the unique icon.

14. The computer program product as recited in claim 13, wherein the displaying program step displays the unique icon to a user.

15. The computer program product as recited in claim 12, wherein the unique icon is not persistent.

16. The computer program product as recited in claim 13, further comprising the program steps of:

if the entry is a registered NFS mountable file system, determining if the entry is a mounted file system;

if the entry is a mounted file system, associating the entry with a second unique icon;

if the entry is not a mounted file system, associating the entry with a third unique icon; and displaying the unique icons in a GUI.

\* \* \* \* \*